July 17, 1934.  E. VON DER LIPPE-LIPSKI  1,966,634
ANIMATED ADVERTISING SIGN
Original Filed Dec. 21, 1931
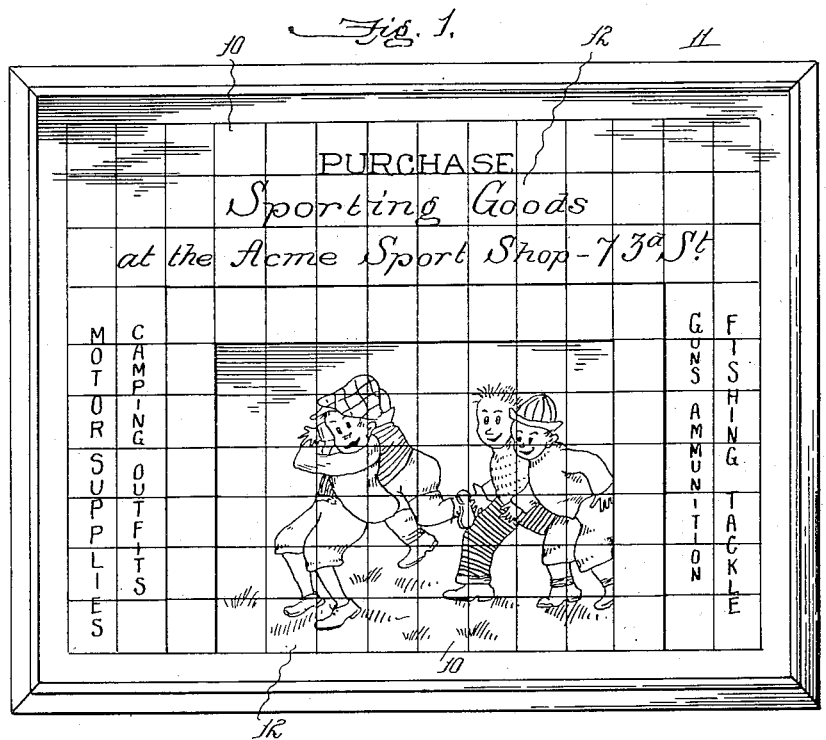
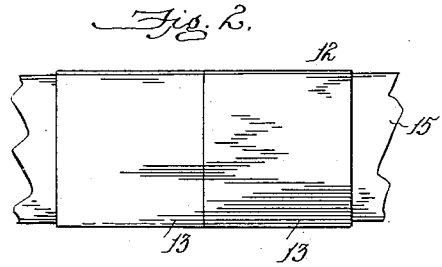
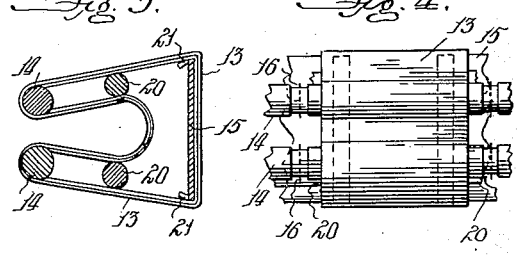
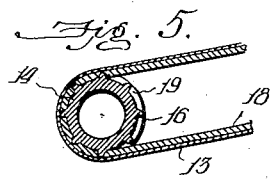
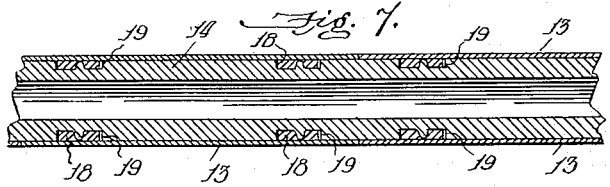
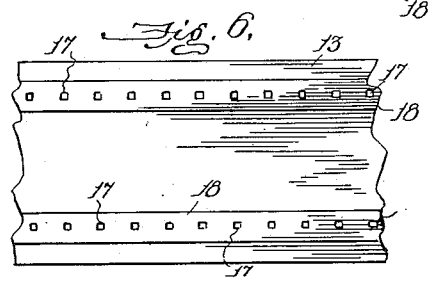
Inventor:-
Elaine von der Lippe-Lipski
By Horace D. Beall
Attorney.

Patented July 17, 1934

1,966,634

UNITED STATES PATENT OFFICE 1,966,634

ANIMATED ADVERTISING SIGN

Elaine von der Lippe-Lipski, Washington, D. C.

Application December 21, 1931, Serial No. 582,389
Renewed August 29, 1933

3 Claims. (Cl. 40—32)

My invention is an improvement in exhibitors or advertising signs and relates more especially to that particular type in which the exhibit is in the form of a picture or sign parts of which are changeable automatically and in such manner as to give the appearance of a motion picture or animated sign.

My invention contemplates an arrangement in which the signboard is mosaic or divided in squares each square being in the form of a unit comprising a continuous film adapted to be intermittently operated, the outer surface of each length of film being divided longitudinally into a multiplicity of sections each representing a different phase of the picture so as to combine with other units in providing an animated picture or sign exhibit whereby the successive exposures of the different phases of the picture on the film of one or more groups of units effects the desired changes of the entire picture or sign or any part thereof for changing the sign, showing an animated picture, or effecting a variety of scenery in theatrical productions.

A further object of my invention is to provide for a positive movement of the film so that the divisions of the surfaces thereof having the different phases of any particular portion of the picture will be flat so that the surface of all the units which cooperate in producing the picture or animated portion thereof will be coplanar or present a substantially smooth picture surface.

My invention also contemplates an arrangement of the continuous film of each unit in such manner that a multiplicity of divisions are provided or a very long film employed in a comparatively small unit or compact space.

With these principal objects in view my present invention consists in the particular construction of a unitary device in the production of an animated picture exhibit or advertising sign, all as hereinafter fully described and more specifically set forth in the appended claims.

In the drawing accompanying this specification:—

Figure 1 is a front elevation showing a changeable exhibitor or animated sign and including an exhibit with different portions thereof adapted to changes for the purpose of illustrating the application of my invention.

Fig. 2 is an enlarged detail front elevation showing two adjacent units and the metal strip over which they are operated.

Fig. 3 is an end elevation of the unit.

Fig. 4 is a rear elevation.

Fig. 5 is a sectional view through one of the rollers of the film operating mechanism and film extending over the same.

Fig. 6 is a rear view of the fragmental portion of the film, and

Fig. 7 is a sectional view through one of the operating rollers.

In carrying out my invention that portion of the signboard 10 within the frame or casing 11 that is to depict those changeable portions of the picture or sign exhibit is made up of units 12, each consisting of a continuous film 13 in the form of a belt passing over operating rollers 14, 14 in the rear of the casing to move the film over a metal strip 15 extending across the front of the signboard from one side of the frame to the other for exposing the different phases of the picture by an intermittent motion of said film imparted thereto by suitable mechanism (not shown) for turning the rollers. For exposing the successive phases of the animated portion of the picture or sign exhibit the outer face of the continuous film is divided into spaces in longitudinal series and extending transversely across said film, the spaced apart rollers 14, 14 over which the film passes engaging the inner surface thereof so as not to mar the surface on which the pictures are painted or imprinted, and as frictional engagement of the film with the rollers cannot be depended upon to insure a regular movement of said film for registration of the same at the front of the signboard a positive motion is imparted by teeth 16 on the rollers engaging recesses 17 in the back of the film in a manner similar to that employed in connection with motion picture machines. However, as the film is made of thin material and perforations through the same would detract from the picture or sign exhibit the recesses 17 are formed in narrow strips 18 of flexible material attached to the film near the longitudinal edges thereof, and to receive these strips so that the intermediate portion of the film may bear against the rollers the latter are provided with circumferential recesses 19 in which said strips operate and from the bottom of which the teeth 16 project to engage the recesses 17.

To increase the length of the continuous film or belt on which portions of the picture or sign are painted or imprinted, without increasing the depth of the casing in which the signboard is mounted, said film is looped inwardly from between the rollers (see Fig. 3) and said looped portion guided by idle rollers 20, 20 bearing against opposite sides thereof, and it will be noted that said idle rollers also bear against the back of the film.

It will be understood that in making up an exhibit or signboard the units depicting the movable or animated portions of the picture or sign will be disposed closely adjoining each other in horizontal series and that as many cooperating additional horizontal series will be employed closely above and below the same as may be required, all the units of any one of the horizontal series passing over one of the metal strips extending across the front of the frame or casing or partly across according to the lengths of the different series or groups, and that in like manner the operating rollers 14, 14 extend a corresponding distance for the operation of the films. It will be understood also that the pull exerted by the roller to which the film passes from the metal strip will act to stretch the film tightly across said strip so that the exposed portions of the group of films will be on the same plane to present a flat surface or mosaic on which the picture or sign is represented, and to reduce wear on the reinforcing strips as well as on the film the opposite edges of the metal strip are provided with extensions 21 over which said reinforcing strips pass.

Any timing mechanism may be employed for imparting intermittent motion to the driving rollers 14, 14 which must revolve in unison and may extend the full length of the series of picture units for operating them synchronously.

By the particular construction of the picture units I provide an animated sign or changeable exhibitor that will effect a large number of changes by reason of the length of the film-belt, and in making up the exhibit one or more portions thereof may be provided with signs and animated subjects and said portion or portions supplied with the units while in the other or unanimated portions of the picture the units may remain stationary or those unanimated portions depicted on stationary portions of the exhibit or signs, as for instance on bars while the groups of changeable units are mounted in casings attached to the back of said bars. It will be obvious therefore that by providing the units adapted to bring different phases of an animated picture into view the changeable exhibitor of animated signboard may be built up to suit the exhibit that is to be displayed, and consequently the cost of the signboard can be reduced by having only a small portion of the exhibit represented as a moving object or animated.

The illustration in Fig. 1 is designed to show an animated picture to attract attention to the advertising sign surrounding the same, and of course the latter can be changed to not only advertise another concern but also the merchandise it handles; in other words the advertising sign surrounding the picture can be changed entirely to advertise different merchandise or to vary the list of goods at the sides of the signboard. Furthermore the changeable exhibitor can be effectively employed to depict a moving steamship leaving a wake, an aeroplane emitting smoke for sky writing, as well as in connection with theatrical scenery, and it will be obvious therefore that its application is not limited to any particular field nor as to details of construction for the arrangement is susceptible of obvious modifications which may be suggested in the practical application of my invention.

I claim:

1. A changeable exhibitor comprising an endless film divided into longitudinal sections on which different phases of the exhibit are depicted to be brought successively into view at the front of the exhibitor, a strip at the front of the exhibitor over which the film passes to provide flat surfaces of the film exhibiting a part or phase of the exhibit, and spaced apart operating rollers in the rear of said strip over which the film passes to and from the same and between which said film is formed into a forwardly projecting loop.

2. A changeable exhibitor comprising an endless film divided into longitudinal sections on which different phases of the exhibit are depicted to be brought successively into view at the front of the exhibitor, said film having spaced apart recesses in the back of the same, a strip at the front of the exhibitor over which the film passes to provide flat surfaces of the film exhibiting a part or phase of the exhibit, and toothed operating rollers in the rear of said strip over which the film passes to and from the same and between which said film is formed into a forwardly projecting loop, the teeth on said rollers engaging the recesses in the back of the film.

3. A changeable exhibitor comprising an endless film divided into longitudinal sections on which different phases of the exhibit are depicted to be brought successively into view at the front of the exhibitor, said film having spaced apart recesses in the back of the same, a strip at the front of the exhibit over which the film passes to provide flat surfaces of the film exhibiting a part or phase of the exhibit, and flexible strips on the back of the film having spaced apart recesses therein; together with operating rollers in the rear of said strip over which the film passes to and from the same and between which said film is formed into a forwardly projecting loop, said rollers having recesses therein to receive the flexible strips, and teeth in the bottom of the recesses in the rollers to engage the recesses in the flexible strips.

ELAINE VON DER LIPPE-LIPSKI.